(12) United States Patent
Holmquist et al.

(10) Patent No.: US 10,860,672 B2
(45) Date of Patent: Dec. 8, 2020

(54) LOCALIZED SELECTABLE LOCATION AND/OR TIME FOR SEARCH QUERIES AND/OR SEARCH QUERY RESULTS

(71) Applicant: R2 Solutions, LLC, Frisco, TX (US)

(72) Inventors: Lars Erik Holmquist, San Francisco, CA (US); Guilherme Chapiewski, Cupertino, CA (US)

(73) Assignee: R2 Solutions, LLC, Frisco, TX (US)

( * ) Notice: Subject to any disclaimer, the term of this patent is extended or adjusted under 35 U.S.C. 154(b) by 259 days.

(21) Appl. No.: 15/870,520

(22) Filed: Jan. 12, 2018

(65) Prior Publication Data

US 2018/0137133 A1   May 17, 2018

Related U.S. Application Data

(63) Continuation of application No. 14/192,624, filed on Feb. 27, 2014, now Pat. No. 9,870,425.

(51) Int. Cl.
*G06F 16/00* (2019.01)
*G06F 16/9537* (2019.01)

(52) U.S. Cl.
CPC ................. *G06F 16/9537* (2019.01)

(58) Field of Classification Search
CPC .... G06F 16/9535; G06F 16/248; G06F 16/00; G06F 17/30; G06F 17/30867; G06F 16/30554; G06F 9/44505; G06F 16/27; G06F 16/219; G06F 16/258; G06F 16/2358; G06F 16/2365; G06F 16/2474; G06F 16/2477; G06F 16/9537; H04L 67/306; G06Q 30/06; G06Q 30/02; G06Q 50/01; G06Q 30/0267; G06Q 10/10; G01S 17/10; H04N 21/4622; H04N 21/4826
See application file for complete search history.

(56) References Cited

U.S. PATENT DOCUMENTS

| | | | |
|---|---|---|---|
| 8,761,512 B1 * | 6/2014 | Buddemeier | ........ G06K 9/6282 382/181 |
| 8,832,566 B2 | 9/2014 | Wakhlu | |
| 9,195,721 B2 | 11/2015 | Soto Matamala | |
| 2002/0045985 A1 | 4/2002 | Kerner | |
| 2003/0115186 A1 | 6/2003 | Wilkinson | |
| 2004/0138947 A1 * | 7/2004 | McGee | ................. G06Q 30/02 705/14.26 |
| 2004/0193656 A1 * | 9/2004 | Pizzo | ................ G06F 16/24552 |
| 2005/0097087 A1 | 5/2005 | Punaganti Venkata | |
| 2007/0050339 A1 * | 3/2007 | Kasperski | ........... G06F 16/9032 |
| 2009/0046270 A1 * | 2/2009 | Hartman | ................ G01S 17/10 356/5.01 |
| 2009/0132469 A1 | 5/2009 | White | |
| 2009/0187473 A1 | 7/2009 | Blaze | |
| 2009/0307198 A1 * | 12/2009 | Zhang | ................ G06F 16/9537 |
| 2010/0178680 A1 | 7/2010 | Goodwin | |

(Continued)

OTHER PUBLICATIONS

U.S. Appl. No. 14/192,624, filed Feb. 27, 2014, 64 pages.

(Continued)

*Primary Examiner* — Anh Ly
(74) *Attorney, Agent, or Firm* — The Noblitt Group, PLLC (57) ABSTRACT

Briefly, embodiments of methods or systems providing a mobile device user with localized and/or time-selectable search query terms and/or search results are provided.

18 Claims, 5 Drawing Sheets

(56) References Cited

U.S. PATENT DOCUMENTS

| | | | |
|---|---|---|---|
| 2011/0059748 A1* | 3/2011 | Taylor | H04W 4/021 455/456.1 |
| 2011/0125759 A1* | 5/2011 | Querel | H04L 51/32 707/748 |
| 2011/0137881 A1 | 6/2011 | Cheng | |
| 2011/0276556 A1 | 11/2011 | Meier | |
| 2012/0046818 A1* | 2/2012 | Nettleton | E21F 17/00 701/23 |
| 2012/0095839 A1* | 4/2012 | Labarca | H04W 4/025 705/14.58 |
| 2012/0240236 A1 | 9/2012 | Wyatt | |
| 2012/0254804 A1* | 10/2012 | Sheha | G06F 3/04842 715/834 |
| 2012/0271828 A1 | 10/2012 | Raghunath | |
| 2012/0289147 A1 | 11/2012 | Raleigh | |
| 2013/0079033 A1 | 3/2013 | Gupta | |
| 2013/0113993 A1* | 5/2013 | Dagit, III | G06F 3/017 348/552 |
| 2013/0132502 A1 | 5/2013 | Stacey | |
| 2013/0147837 A1 | 6/2013 | Stroila | |
| 2013/0151533 A1 | 6/2013 | Udupa | |
| 2013/0285855 A1 | 10/2013 | Dupray | |
| 2013/0308822 A1 | 11/2013 | Marimon | |
| 2013/0325856 A1 | 12/2013 | Soto Matamalo | |
| 2013/0331125 A1 | 12/2013 | Dini | |
| 2013/0339345 A1 | 12/2013 | Soto Matamalo | |
| 2014/0033307 A1* | 1/2014 | Schmidtler | H04L 63/1483 726/22 |
| 2014/0046792 A1 | 2/2014 | Ganesan | |
| 2014/0157370 A1 | 6/2014 | Plattner | |
| 2014/0201180 A1* | 7/2014 | Fatourechi | G06F 16/48 707/706 |
| 2014/0207748 A1 | 7/2014 | Sood | |
| 2014/0207784 A1 | 7/2014 | Carasso | |
| 2014/0229336 A1 | 8/2014 | Wormhoudt | |
| 2014/0249771 A1 | 9/2014 | Yang | |
| 2014/0273212 A1 | 9/2014 | Turner | |
| 2014/0280316 A1 | 9/2014 | Ganick | |
| 2014/0280339 A1 | 9/2014 | Jain | |
| 2014/0330770 A1 | 11/2014 | Yerli | |
| 2014/0365934 A1* | 12/2014 | Moore | G01C 21/3664 715/769 |
| 2014/0370879 A1 | 12/2014 | Redding | |
| 2015/0058355 A1* | 2/2015 | Naqvi | G06F 16/29 707/746 |
| 2015/0119068 A1 | 4/2015 | Kudekar | |
| 2015/0169605 A1 | 6/2015 | Kogan | |

OTHER PUBLICATIONS

U.S. Appl. No. 14/192,624 / Filing Receipt, filed Mar. 20, 2014, 3 pages.
U.S. Appl. No. 14/192,624 / Notice of Publication, dated Aug. 27, 2015, 1 pages.
U.S. Appl. No. 14/192,624 / Non-Final Rejection, dated Jan. 7, 2016, 20 pages.
U.S. Appl. No. 14/192,624 / Amendment/Req. Reconsideration-After Non-Final Reject, dated Apr. 7, 2016, 24 pages.
U.S. Appl. No. 14/192,624 / Final Rejection, dated Jun. 2, 2016, 23 pages.
U.S. Appl. No. 14/192,624 / Response After Final Action, dated Aug. 2, 2016, 13 pages.
U.S. Appl. No. 14/192,624 / After Final Consideration Program Decision, dated Aug. 15, 2016, 1 page.
U.S. Appl. No. 14/192,624 / Advisory Action, dated Aug. 15, 2016, 4 pages.
U.S. Appl. No. 14/192,624 / RCE and Amendments, dated Sep. 2, 2016, 22 pages.
U.S. Appl. No. 14/192,624 / Non-Final Rejection, dated Sep. 20, 2016, 27 pages.
U.S. Appl. No. 14/192,624 / Amendment/Req. Reconsideration-After Non-Final Rejection, dated Jan. 23, 2017, 24 pages.
U.S. Appl. No. 14/192,624 / Final Rejection, dated Apr. 10, 2017, 30 pages.
U.S. Appl. No. 14/192,624 / After Final Consideration Program Request, filed Jun. 12, 2017, 23 pages.
U.S. Appl. No. 14/192,624 / After Final Consideration Program Decision, filed Jun. 30, 2017, 1 page.
U.S. Appl. No. 14/192,624 / Advisory Action, dated Jun. 30, 2017, 4 pages.
U.S. Appl. No. 14/192,624 / RCE and Amendments, dated Aug. 9, 2017, 21 pages.
U.S. Appl. No. 14/192,624 / Notice of Allowance and Fees Due, dated Sep. 6, 2017, 9 pages.
U.S. Appl. No. 14/192,624 / Application Data Sheet to update/correct info, Oct. 23, 2017, 7 pages.
U.S. Appl. No. 14/192,624 / Filing Receipt, Oct. 25, 2017, 3 pages.
U.S. Appl. No. 14/192,624 / Issue Fee Payment, Dec. 6, 2017, 1 page.
U.S. Appl. No. 14/192,624 / Issue Notification, Dec. 27, 2017, 1 page.

* cited by examiner

LOCALIZED SELECTABLE LOCATION AND/OR TIME FOR SEARCH QUERIES AND/OR SEARCH QUERY RESULTS

BACKGROUND

1. Field

This disclosure relates to search queries and/or search results.

2. Information

At times, a mobile device user may find themselves in an unfamiliar environment, such as while on vacation, on a business trip, or during an afternoon family outing, for example. A mobile device user may access a smart phone, or other handheld computing and/or communications device in an attempt to determine popular places, landmarks, restaurants, or the like, that may provide entertainment, dining, and/or recreational opportunities. However, although a mobile device user may be capable of accessing a search engine, which may enable a user to gain some knowledge as to a location of nearby establishments, he or she may have little knowledge concerning uniqueness, quality, and/or popularity of particular restaurants, entertainment venues, attractions, or the like. A mobile device user may at times themselves unproductively searching for venues as a result.

In other instances, for example, a vacationing mobile device user may attempt to plan a future event, such as a dinner for an upcoming evening or a breakfast the following day, for example. Here, again, although a mobile device user may have access to a search engine, the user may have difficulty knowing whether a nightclub, for example, which may be closed during the day, is likely to represent worthwhile entertainment in the evening. A mobile device user may access outdated reviews, reviews from potentially untrustworthy sources, or reviews that may be more relevant to a day of the week that is different than a day of the week of interest to a mobile device user, for example. Accordingly, a mobile device user may be capable of performing searches for venues that may at least appear to be appealing, but may not be entirely suitable for an occasion.

BRIEF DESCRIPTION OF DRAWINGS

Claimed subject matter is particularly pointed out and/or distinctly claimed in the concluding portion of the specification. However, both as to organization and/or method of operation, together with objects, features, and/or advantages thereof, claimed subject matter may be understood by reference to the following detailed description if read with the accompanying drawings in which:

Reference is made in the following detailed description to accompanying drawings, which form a part hereof, wherein like numerals may designate like parts throughout to indicate corresponding and/or analogous components. It will be appreciated that components illustrated in the figures have not necessarily been drawn to scale, such as for simplicity and/or clarity of illustration. For example, dimensions of some components may be exaggerated relative to other components. Further, it is to be understood that other embodiments may be utilized. Furthermore, structural and/or other changes may be made without departing from claimed subject matter. It should also be noted that directions and/or references, for example, up, down, top, bottom, and so on, may be used to facilitate discussion of drawings and/or are not intended to restrict application of claimed subject matter. Therefore, the following detailed description is not to be taken to limit claimed subject matter and/or equivalents.

DETAILED DESCRIPTION

In the following detailed description, numerous specific details are set forth to provide a thorough understanding of claimed subject matter. For purposes of explanation, specific numbers, systems, and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes, and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, or characteristic described in connection with a particular implementation or embodiment may be included in at least one implementation or embodiment of claimed subject matter. Thus, appearances of such phrases, for example, in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with context. Therefore, particular context of description or usage may provide helpful guidance regarding inferences to be drawn.

Operations and/or processing, such as in association with networks, such as communication networks, for example, may involve physical manipulations of physical quantities. Typically, although not necessarily, these quantities may take the form of electrical and/or magnetic signals or states capable of, for example, being stored, transferred, combined, processed, compared, and/or otherwise manipulated. It has proven convenient, at times, principally for reasons of common usage, to refer to these signals as bits, data, values, elements, symbols, characters, terms, numbers, numerals, and/or the like. It should be understood, however, that all of these or similar terms are to be associated with appropriate physical quantities and are intended to merely be convenient labels.

Likewise, in this context, the terms "coupled," "connected," and/or similar terms, may be used. It should be understood that these terms are not intended as synonyms. Rather, "connected" may be used to indicate that two or more elements or other components, for example, are in direct physical and/or electrical contact; while, "coupled" may mean that two or more components are in direct physical or electrical contact; however, "coupled" may also mean that two or more components are not in direct contact, but may nonetheless co-operate or interact. The term "coupled" may also be understood to mean indirectly connected, for example, in an appropriate context.

The terms, "and," "or," "and/or," and/or similar terms, as used herein, may include a variety of meanings that also are expected to depend at least in part upon the particular context in which such terms are used. Typically, "or" if used to associate a list, such as A, B, or C, is intended to mean A, B, and C, here used in the inclusive sense, as well as A, B, or C, here used in the exclusive sense. In addition, the term "one or more" and/or similar terms may be used to describe any feature, structure, and/or characteristic in the singular and/or may be used to describe a plurality or some other combination of features, structures and/or characteristics. Though it should be noted that this is merely an illustrative example and claimed subject matter is not limited to this example. Again, particular context of description or usage may provide helpful guidance regarding inferences to be drawn.

It should be understood that for ease of description, a network device may be embodied and/or described in terms of a computing device. However, it should further be understood that this description should in no way be construed that claimed subject matter is limited to one embodiment, such as a computing device or a network device, and, instead, may be embodied as a variety of devices or combinations thereof, including, for example, one or more illustrative examples.

In this context, the term "network device" refers to any device capable of communicating via and/or as part of a network. Network devices may be capable of sending and/or receiving signals (e.g., signal packets), such as via a wired or wireless network, may be capable of performing arithmetic and/or logic operations, processing and/or storing signals, such as in memory as physical memory states, and/or may, for example, operate as a server. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of network devices, including between wireless devices coupled via a wireless network, for example. It is noted that the terms, server, server device, server computing device, server computing platform, and/or similar terms are used interchangeably. Similarly, the terms client, client device, client computing device, client computing platform, mobile computing device, mobile device, and/or similar terms are also used interchangeably. While in some instances, for ease of description, these terms may be used in the singular, such as by referring to a "client device" or a "server device," the description is intended to encompass one or more client devices or one or more server devices, as appropriate. Along similar lines, references to a "database" are understood to mean, one or more databases and/or portions thereof, as appropriate.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, and/or any combination thereof. Thus, a network may be worldwide in scope and/or extent. Likewise, sub-networks, such as may employ differing architectures or may be compliant and/or compatible with differing protocols, such as communication protocols (e.g., network communication protocols), may interoperate within a larger network. Various types of devices may be made available so that device interoperability is enabled and/or, in at least some instances, may be transparent to the devices. In this context, the term transparent refers to communicating in a manner so that communications may pass through intermediaries, but without the communications necessarily specifying one or more intermediaries, such as intermediate devices, and/or may include communicating as if intermediaries, such as intermediate devices, are not necessarily involved. For example, a router may provide a link between otherwise separate and/or independent LANs. In this context, a private network refers to a particular, limited set of network devices able to communicate with other network devices in the particular, limited set, such as via signal packet transmissions, for example, without a need for re-routing and/or redirecting such communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions, for example. As another example, a logical broadcast domain may comprise an example of a private network. It is understood in this context that a private network may provide outgoing communications to devices not in the private network, but such devices outside the private network may not direct inbound communications to devices included in the private network.

The Internet refers to a decentralized global network of interoperable networks, including devices that are part of those interoperable networks. The Internet includes local area networks (LANs), wide area networks (WANs), wireless networks, and/or long-haul public networks that, for example, may allow signal packets to be communicated between LANs. The term world wide web (WWW) and/or similar terms may also be used to refer to the Internet. Signal packets, also referred to as signal packet transmissions, may be communicated between nodes of a network, where a node may comprise one or more network devices, for example. As an illustrative example, but without limitation, a node may comprise one or more sites employing a local network address. Likewise, a device, such as a network device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc. that may, for example, route a signal packet in accordance with a target address and availability of a network path of network nodes to a target address.

Physically connecting portions of a network via a hardware bridge, as one example, may be done, although other approaches also exist. A hardware bridge, however, may not typically include a capability of interoperability via higher levels of a network protocol. A network protocol refers to a set of signaling conventions for communications between or among devices in a network, typically network devices, but may include computing devices, as previously discussed; for example, devices that substantially comply with the protocol or that are substantially compatible with the protocol. In this context, the term "between" and/or similar terms are understood to include "among" if appropriate for the particular usage. Likewise, in this context, the terms "compatible with," "comply with" and/or similar terms are understood to include substantial compliance or substantial compatibility. Typically, a network protocol has several layers. These layers may be referred to here as a communication stack. Various types of communications may occur across various layers. For example, as one moves higher in a communication stack, additional functions may be available by transmitting communications that are compatible and/or compliant with a particular network protocol at these higher layers.

A network may be very large, such as comprising thousands of nodes, millions of nodes, billions of nodes, or more, as examples. Media networks, such as the Yahoo!™ network, for example, may be increasingly seeking ways to attract users to their networks and/or to retain users within their networks for extended periods of time. A media network may, for example, comprise an Internet website or group of websites having one or more sections. For instance, the Yahoo!™ network includes websites located within different categorized sections, such as sports, finance, current events, games, matters of local interest, to name just a few non-limiting examples among a variety of possible examples. To attract and/or retain users within its network, Yahoo!™ and/or other media networks may continually strive to provide content relating to categorized and/or localized sections that may be interesting, relevant, and/or of use to users.

As more users remain within a media network for extended periods of time, a media network may become more valuable to potential advertisers. Thus, typically, advertisers may be inclined to pay more money and/or provide other considerations to a media network in return for advertising to users, for example, via that media network, its partners, and/or subsidiaries. In an implementation, if a user displays a page, perhaps as a result of utilizing a search engine, a server (or other source) located within or external to a processing and/or communications infrastructure of a media network may deliver relevant content, which may include, for example, textual and/or multimedia content that may entice users to remain for a relatively extended period of time. Access, such as links to content (e.g., such as hyperlinks to websites located outside of a media network), may also be presented to users. Thus, even if users are directed to websites outside of a particular media network, users may remain loyal to the media network in the future if they believe that the network consistently provides access, such as links, or otherwise directs them to relevant and/or useful content. In this context, the term "content" includes, as examples, images, video, audio, text, and/or multimedia, such in the form of stored physical (e.g., memory) states or in the form of electronic signals, for example.

As a non-limiting example, responsive to submitting a search query (e.g., search terms that may be submitted to an online search engine) for example, or as a result of any other type of user interaction with a client computing platform, for example, such as via a browser, a user may access one or more pages (e.g., web pages), for example. In an implementation, a "cookie" or other identifier (e.g., for example, locally stored physical (e.g., memory) states capturing details regarding a website interaction) may be used to identify a client computing platform, including a computing device, to one or more servers, for example. In this context, the term query, search query or the like is understood to refer to a search query conducted via an online search engine. Likewise, the term query results, search results or the like in this context are understood to refer to results returned as a result of submitting a search query to an online search engine. To perform a content retrieving operation for example, a server, for example, may perform one or more operations based, at least in part, on one or more modules of executable instructions, such as software or firmware, for example. It is noted that terms, such as "operation," and "function," or the like, may be used interchangeably in this context. It should also be noted that claimed subject matter is not limited to user-submitted queries and/or may also include query results.

As the term is used herein, a "localized region" may comprise a division of an area on the surface of the Earth. Localized refers to a local proximity that may vary to some extent with the particular situation and/or context. Localized regions may comprise an approximately rectangular area or an area characterized or identified by another type of polygon, having one or more sides expressed, for example, in terms of meters and/or kilometers. In one example, an urban environment may be divided into rectangular shaped localized regions having sides measuring approximately 1.0 kilometers, or other distance, for example. In another example, a localized region within a rural environment may comprise an approximately rectangular area, or an area characterized by another type of polygon, having one or more sides measuring approximately 10.0 kilometers or other distance, for example. In some embodiments, an area may comprise a mix of differently-sized localized regions, wherein for example, a portion of an area may be divided into localized regions comprising approximately 1.0 kilometer×1.0 kilometer rectangles, while other localized regions may be divided into, for example, 2.0 kilometer×2.0 rectangles. Localized regions may also be characterized by a variety of irregularly shaped boundaries that may coincide with shorelines, rivers, landmarks, international borders, national parks, military bases, Indian reservations and so forth, and claimed subject matter is not limited in this respect. It is, of course, understood, that a region is not limited to any particular shape. Rather, these are merely illustrative examples.

A localized region may also comprise one or more neighborhoods or other semi-regularly known areas that may change over time. A localized region may thus encompass a more colloquially known area without otherwise formally recognized boundaries. In one possible example, a localized region may comprise the Chinatown neighborhood in San Francisco or the Greenwich Village area of New York City. A localized region may also encompass one or more occasional short-lived communities such as "Super Bowl Village," which may comprise an irregularly-shaped short-lived (e.g., temporary) area that may be established for days preceding and/or following a Super Bowl, for example. Localized regions may comprise other types of communities and/or neighborhoods, and claimed subject matter is not limited in this respect.

A localized region may also comprise an area characterized by search queries and/or search results submitted by mobile device users at a frequency greater than a threshold amount, for example. Thus, for example, in one embodiment, a localized region may be associated with an amount of queries and/or associated results capable of being processed conveniently. For example, a region in an urban area may have a different geographical size that a region in a desert area, although, for example, a roughly equivalent amount of queries and/or associated results may correspond to those regions. In one possible example, if a number of mobile device users at locations near a particular area of San Francisco, for example, submit queries comprising particular query search terms such as "Fisherman's Wharf," a localized region encompassing the locations near the particular area may be identified. In embodiments, mobile devices within a localized region may compute one or more position estimations using a satellite positioning system, such as the Global Positioning System, for example, and/or using other approaches, such as Advanced Forward Link Trilateration, positioning assistance via Wi-Fi signals, and/or any other position estimation technique, and claimed subject matter is not limited in this respect.

As the term is used herein, a "timeframe" may refer to at least an approximate and/or recognized (e.g., local and/or otherwise) time window. It is noted that a localized time frame may refer to one recognized in a local proximity, although, again, this may vary with particular situations and/or contexts. Thus, for example, a timeframe may comprise a particular or approximate range of hours during a day, such as, from 9:00 AM to 10:00 AM, 12:00 PM to 4:00 PM, etc. or an approximate range. A timeframe may comprise a customary time span referenced from a specific or approximate time of day, such as "quitting time," which may be used to express a time span shortly before and after approximately 5:00 PM.

A timeframe may also comprise a traditional or customary occurrence, such as "early morning," "breakfast," "lunch," "brunch," "siesta," "happy hour," or other event, which may vary from place to place (e.g., localized). For example, in certain urban areas, "rush hour" may indicate an approximately one-hour time span prior to approximately 8:00 AM. In other areas, for example, rush-hour may indicate an approximately one-hour time span prior to 9:00 AM. In another example, in some parts of Latin America, a "siesta" timeframe may comprise a period of time between approximately 2:00 PM and approximately 5:00 PM. However, in other parts of Latin America, a siesta timeframe may comprise a period of time between approximately 1:00 PM and approximately 3:00 PM, for example. A timeframe may also comprise a particular or approximate time span that may be referenced to a portion of an event, such as prior to the start of a football game, during a football game, an intermission (e.g., halftime), and/or post-game. In another example, a timeframe may be referenced to a parade, such as before a parade, during a parade, and/or after a parade, for example. Accordingly, in embodiments, a timeframe may indicate a time span as indicated by a clock or may be expressed according to one or more local customs and/or traditions (e.g., localized). In still other embodiments, a timeframe may indicate a time span that is referenced to an event, such as a sporting event, for example, and claimed subject matter is not limited in this respect.

As previously alluded to herein, a mobile device user may occasionally find themselves in an unfamiliar environment, such as while on vacation, on a business trip, just to name a couple of examples. Thus, a user may access his or her mobile device, such as a smart phone or other handheld computing and/or communications device (e.g., tablet computer, laptop computer, wearable computing device, and so forth) in an attempt to determine which establishments (e.g., landmarks, restaurants, recreational facilities, etc.) that may provide entertainment, dining, or the like. This may involve a mobile device user accessing an online search engine, which may enable a user to gain some knowledge as to a location of nearby establishments based, at least in part, on a submitted query. In response, a server may convey names and/or addresses of establishments, for example, and/or other content that may pertains to one or more establishments. However, submitted search queries may not provide a mobile device user with an indication of popularity, for example, of an establishment. It is noted that in this context, popularity may be measured in a variety of ways. As one example, a frequency and/or number of times a search query is received and/or a number of times an establishment appears in a search result; however, in this context, the term popularity is intended to be sufficiently understood so that other techniques for measuring popularity via online usage or the like is intended to be included in this context. Further, while submitted search queries may be relevant to a current time and location of a mobile device user, in many instances, a user may have little knowledge of popularity, ambiance, mood, and/or appeal of particular restaurants, entertainment venues, attractions, or the like. Thus, for example, a mobile device user may find themselves visiting several establishments, many of which do not meet his or her expectations.

In related instances, a mobile device user visiting an unfamiliar city, for example, may attempt to plan a future event, such as a dinner for an upcoming evening or a breakfast on a subsequent day, just to name two examples. Again, while a user may have access to a search engine by way of a handheld mobile device, a user may have difficulty knowing whether a restaurant, for example, represents a popular establishment or whether an establishment leaves much to be desired. In these instances, without knowledge of popularity of a particular establishment, a mobile device user may access outdated reviews, reviews from potentially biased sources, for example.

In other instances, although a mobile device user may be capable of accessing one or more credible reviews of an establishment, reviews may be relevant to a different time of day or for a different day of a week than is of interest to a user, for example. In one possible example, a nightclub may post favorable reviews for Friday and Saturday night events, but may be virtually deserted during from Sunday through Thursday. In another example, if a mobile device user is interested in visiting an establishment during a particular holiday, he or she may be capable of accessing general reviews for an establishment. However, ascertaining if an establishment is, in fact, a popular destination on a particular day of a week or on a particular holiday may be problematic or at least inconvenient.

In embodiments, a mobile device user at a localized region may be provided with a capability to access n-grams (e.g., bigrams, trigrams, and so forth) corresponding to query search terms and/or query search results submitted by other mobile device users in a localized region, which may include, for example, a user's current location, and/or a user-selectable timeframe. For example, a mobile device user planning a dining event for 7:00 PM may obtain popular search query n-grams and/or search results for one or more searches submitted at 7:00 PM on a previous day by other mobile devices within the same or substantially the same localized region and/or a nearby localized region. By obtaining popular query search terms, for example, submitted by other mobile device users at a particular time on a previous day, for example, a mobile device user may gain insight into what is more likely to be popular at that time, or at a similar time, of the current day. For example, if a mobile device user located in the same or similar localized region, at approximately 7:00 PM, submits a query "Where is Alito's Restaurant" the bigram "Alito's Restaurant," may be extracted from a query and stored in a database along with one or more query search results. Thus, if a mobile device user is planning a dining event for approximately 7:00 PM on a different evening, such as this evening, a user may access a website, for example, and determine that Alito's Restaurant is more likely to be a popular destination. Insight may, for example, permit a mobile device user to reserve one or more tables at a popular restaurant, invite friends, plan routes and/or follow-on activities, and so forth.

Figure 1:
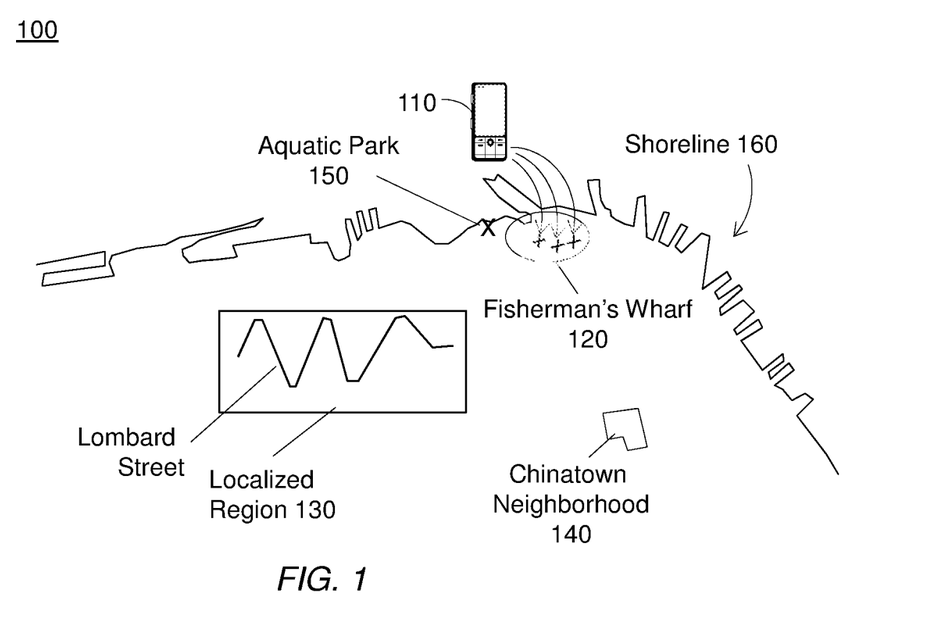
FIG. 1 is a schematic illustration of a map showing locations of mobile devices and various localized regions according to an embodiment.

FIG. 1 is a schematic illustration of a map 100 showing locations of mobile devices and various localized regions according to an embodiment. Of course, claimed subject matter is not limited in scope to mobile devices. However, continuing, in FIG. 1, shoreline 160 is shown curving around various portions of an urban area, which, for this example, corresponds to a portion of the city of San Francisco. An outline of shoreline 160 shows marinas, piers, and/or other features, such as aquatic park 150 and a localized region that includes Fisherman's Wharf 120. It should be noted that FIG. 1 is merely representative of an urban area, and claimed subject matter is intended to embrace all types of areas, such as urban areas, suburban areas, rural areas, uninhabited areas, national parks, military bases, and so forth.

Within a localized region that includes Fisherman's Wharf 120, several or even many of mobile devices 110 may be present. Mobile devices 110 may compute estimates of current positions by way of acquiring signals from GPS satellites, for example, or may estimate current positions using other location estimation approaches, such as Advanced Forward Link Trilateration, Wi-Fi signals, or by way of any other position estimation technique, and claimed subject matter is not limited in this respect. Although not explicitly identified in FIG. 1, one or more of mobile devices 110 may be co-located with one or more mobile device users, who may be shopping, dining, sightseeing, and so forth. Again, claimed subject matter is not limited in scope to use with mobile devices.

In embodiments, users co-located with one or more of mobile devices 110 may submit search queries and/or receive search query results pertaining to nearby points of interest, for example. Thus, in one possible example, a mobile device user located within a localized region that includes Fisherman's Wharf 120 may submit a search query and/or receive search results pertaining to one or more dining establishments located within a localized region. In some instances, for example, search queries and/or search results may be unlikely to be present in connection with queries employing search terms submitted by mobile device users estimated to be located outside the localized region. Thus, for example, a mobile device user at an estimated position within a localized region that includes Fisherman's Wharf 120 may be more likely to submit search queries, and/or receive search results, pertaining to restaurants, pubs, café s, and other points of interest also within the localized region that includes Fisherman's Wharf 120, for example. Further, a mobile device user may be less likely to submit queries, and/or receive search results, pertaining to locations outside the localized region that includes Fisherman's Wharf 120.

In another example, mobile device users at an estimated position within Chinatown neighborhood 140, which may comprise a polygon-shaped neighborhood comprising several city blocks in first and second directions, may, for example, be more likely to submit search queries and/or receive search results pertaining to establishments located within Chinatown neighborhood 140. Queries may include restaurants located within Chinatown neighborhood 140, and/or other goods and/or services that may be likely be obtained in Chinatown and may be less likely to be obtainable outside Chinatown, for example. It, therefore, may be desirable to employ a mechanism or an approach to capture queries and/or associated search results for a localized position and/or a localized time, for example.

Figure 2:
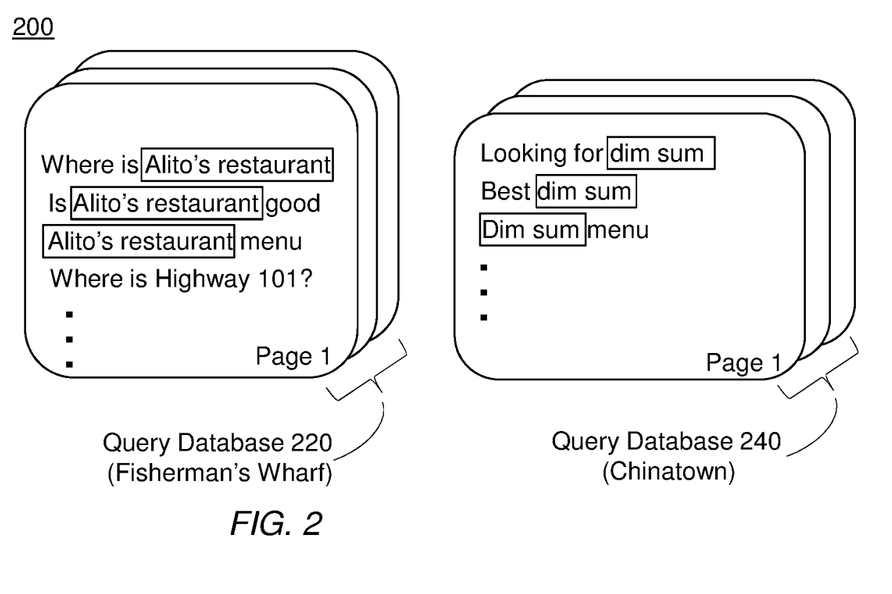
FIG. 2 is a schematic diagram showing various search queries stored in databases pertaining to localized regions according to an embodiment.

FIG. 2 is a schematic diagram 200 showing various search queries stored in databases, such as pertaining to localized regions according to an embodiment, for example. In the embodiment of FIG. 2, query database 220 may comprise search queries and/or search results received from, for example, mobile device users at estimated locations within, for example, the localized region that includes Fisherman's Wharf 120 of FIG. 1 in an embodiment. Query database 240, also shown in FIG. 2, may comprise search queries and/or search results received from users at estimated locations within Chinatown 140. Thus, for example, query database 220 may comprise queries pertaining to one or more restaurants, such as Alito's Restaurant, located within a localized region that includes Fishermen's Wharf 120. Possible queries may include, for example, "Where is Alito's restaurant," "Is Alito's restaurant good," and "Alito's restaurant menu." In a similar manner, query database 240 may comprise an analogous or other arrangement of received queries, such as "looking for dim sum," "best dim sum," "dim sum sale." Of course, query databases, such as query databases 220 and 240, may include a large number of additional queries not shown in FIG. 2, which may pertain to, for example, different restaurants, shops, pubs, nightclubs, and/or a variety of other points of interest within the localized region that includes, for example, Fisherman's Wharf 120, and claimed subject matter is not limited in this respect. Query database 220 may also include, for example, queries that may appear unrelated to a localized region that includes Fisherman's Wharf 120, such as, for example, "Where is Highway 101" as shown in FIG. 2. Query database 220 may store query search terms (e.g., bigrams, trigrams, and so forth) and/or search results over a time period comprising, for example, the preceding six months, one year, five years, and so forth, and claimed subject matter is not limited to storage of search terms and/or results over any particular time period. Further, database 220 may be periodically and/or occasionally updated in a manner that permits emphasis of more recent search terms and/or results in relation to less recent search terms and/or results, for example, as explained here.

In embodiments, queries from mobile device users at localized regions, such as a localized region that includes Fisherman's Wharf 120 and/or Chinatown neighborhood 140, for example, may be arranged within a database as one or more electronic documents. Electronic documents may, for example, comprise universal resource locators (URLs), structured documents, such as XML or PDF documents, and so forth. Accordingly, in the example of FIG. 2, an online search engine, such as may be implement via one or more servers, may receive queries from mobile device users, which may number into the thousands, millions, and so forth. In an embodiment, for example, servers implementing an online search engine, for example, may electronically filter one or more electronic documents to identify search terms and/or combinations of search terms (e.g., bigrams, trigrams, and so forth) and claimed subject matter is not limited in this respect.

A variety of queries submitted by mobile device users within localized regions may be processed so as to rank popularity of one or more search terms based, at least in part, for example, on frequency of occurrence of search terms and/or combinations of search terms or a similar approach. As discussed previously, a variety of approaches to measuring popularity in an online context may be employed and are intended to be included within claimed subject matter. In the example of FIG. 2, queries comprising search terms "Alito's restaurant" from query database 220 may be filtered which may, at least in one possible example, result in a determination that the search terms "Alito's restaurant" appear at a relatively greater frequency compared with other search terms. Similarly, one or more servers, for example, executing a process may determine that queries comprising the search terms "dim sum" from query database 240 may appear with a greater frequency relative to other search terms. In embodiments, various techniques may be employed to determine or to estimate popularity of one or more search terms and/or search results, such as through a use of filtering approaches.

As a non-limiting example, one technique may comprise a term frequency-inverse document frequency (TF-IDF) approach, for example. In particular embodiments, if a search term appears in a relatively large number of search queries from mobile device users located within a localized region ($Q_1$), and appears in a small number of queries from mobile device users located outside of a localized region ($Q_2$), a ratio of $Q_1/Q_2$ may be employed to identify search terms and/or search results of interest. In one possible example, for a larger ratio of $Q_1/Q_2$, for example, emphasis of a search term and/or search result may be increased. For smaller ratios of $Q_1/Q_2$, emphasis of a search term and/or search result may be decreased. It should be noted, however, that this approach reflects merely one of many approaches toward identifying search terms and/or search results, and claimed subject matter is not intended to be limited to use of any particular approach.

In embodiments, query databases 220 and 240 may comprise one or more pages, in which a page may comprise, for example, queries submitted by mobile device users filtered according to a given timeframe, for example. Thus, queries received during a traditional "dinner" timeframe, e.g., in accordance with a time stamp for a submitted query, for example, such as between 5:00 PM and 7:00 PM, may be arranged in a particular page or block of pages within database 220. Likewise, queries from Chinatown neighborhood 140 received during the morning hours, such as between 8:00 AM and 10:00 AM may be arranged in a particular page or block of pages within database 240. Additional pages and/or blocks of pages within query databases 220 and 240 may be indexed according to different timeframes, such as between particular hours of a day, traditional or customary occurrences (e.g., breakfast, lunch, happy hour, etc.), or may be indexed and/or referenced relative to a portion of a sporting event (e.g., pregame, halftime, post-game, etc.), and claimed subject matter is not limited in this respect. It should be further noted that pages of query databases 220 and 240 may be indexed according to days of the week, for example, in which days of the week may be separately indexed. In other implementations, however, days during a workweek (e.g., Monday through Friday) may be grouped together in a first page, and days during a weekend (e.g., Saturday-Sunday) may be grouped together in a second page. Further, in certain implementations, pages of query databases 220 and 240 may be indexed according to traditional holidays, such as a religious or secular holiday, a non-work day designated by a government authority, or any combination thereof, based, for example, on user submitted search queries and/or search results.

Returning to FIG. 1, query search terms received from users at other localized regions, such as rectangular shaped localized region 130, which may comprise an area encompassing at least a portion of Lombard Street. Query search terms received from mobile devices at estimated locations within localized region 130 may be arranged into one or more electronic documents in a query database, which may be structured in a manner similar to query database 220 in 240 of FIG. 2, for example. Likewise, query search terms received from mobile device users at estimated positions within a localized region nearby Aquatic Park 150 may also be arranged into electronic documents of a query database, for example. Of course, an urban area, such as depicted in FIG. 1, for example, may be divided into many localized regions, wherein localized regions may correspond with a query database, for example, and claimed subject matter is not limited to any number of localized regions and/or query databases.

Figure 3:
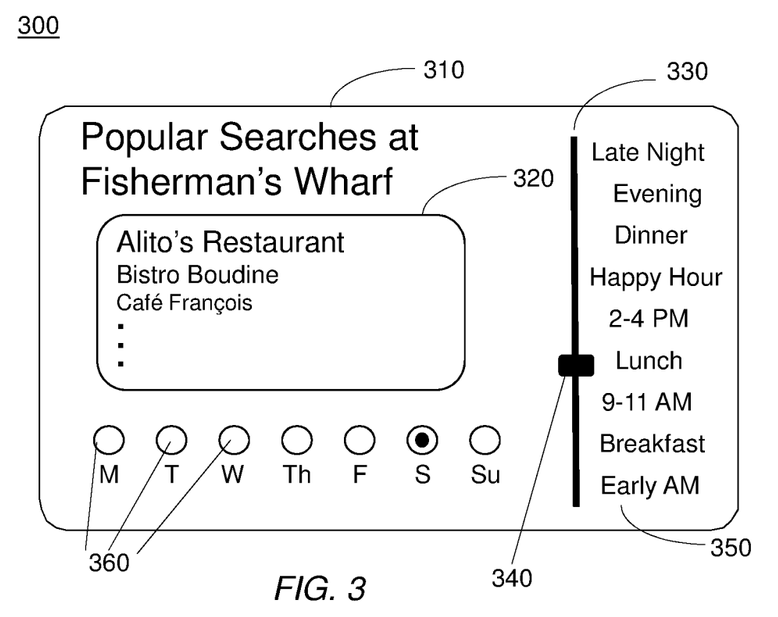
FIGS. 3-4 are schematic diagrams of a display device rendering possible user interfaces according to an embodiment.

FIG. 3 shows a display device 300 rendering a possible user interface according to an embodiment. Of course, claimed subject matter is not limited in scope to examples provided for illustration purposes. Display device 300 may correspond to a display device of, for example, mobile device 110 shown in FIG. 1. In one embodiment, responsive to a mobile device user initiating an application by way of a user interface that may operate on a mobile device, for example, a user's estimated location and/or one or more portions of a user profile may be transmitted wirelessly to one or more servers, such as may include one or more processors, for example, coupled to one or more query databases, such as query databases 220. Responsive to receipt of a mobile device's estimated location, a desired day of a week and/or timeframe, a server may transmit suggestions across a wireless communications channel to be received by a mobile device. Search query terms and/or results may be displayed in suggestions window 320 of display device 310. Likewise, in another embodiment, rather than a client device application, a web interface may be employed.

In the specific example of FIG. 3, a mobile device user may position a scrub bar slider 340 to a location on scrub bar 330 corresponding to a "Lunch" entry on timeframe list 350. In response to a user selection, a mobile device may wirelessly transmit a selected timeframe (e.g., "Lunch") and a selected day, which may be selected using day selector 360, to a server that may access one or more query databases for example. A mobile device may additionally transmit an estimated location, which may be computed by way of acquiring signals from GPS satellites, or may be estimated using other position estimation approaches, such as Advanced Forward Link Trilateration. Positioning assistance may also be achieved using Wi-Fi signals, such as round trip signal delay measurements, comparison of received signal strength with heatmap signatures overlaid on an electronic digital map, or the like. In response, a server may transmit a list of popular search terms to a mobile device for display in suggestions window 320, which is rendered in window 310.

In embodiments, based, at least in part, on an estimated location and/or a history of a user's past search queries, a server may transmit suggestions to a mobile device. In one possible example, if a user has a history of initiating search queries for certain types of restaurants, such as Chinese, Mexican, Vietnamese, and so forth, a server may, or without user input, transmit popular search queries and/or search results that may be relevant to these types of restaurants. Accordingly, upon or after power up of a mobile device in a particular localized region, a mobile device user may receive query terms and/or search results that may be more likely to pertain to a user's interests.

Suggestions listed within suggestions window 320 may be rendered using a particular font size, for example, which may correspond to a particular establishment's popularity. Thus, for example, if Alito's Restaurant corresponds to a popular search term and/or search result for a given timeframe (e.g., lunch), Alito's restaurant may be emphasized using a font size larger than other text displayed in suggestions window 320. Less popular search terms and/or search results (e.g., Bistro Boudine and Café Francois) may be deemphasized, for example, using somewhat smaller font sizes. It should be noted, however, that popular search terms may be emphasized/deemphasized by way of alternative approaches, such as through a use of boldface type, varying color schemes, varying fonts, and so forth, and claimed subject matter is not limited in this respect.

In some embodiments, search terms and/or search results pertaining to establishments unique to a particular localized area may be emphasized. Thus, in the example of FIG. 3, if Alito's Restaurant, which may be unique to the localized region that includes Fisherman's Wharf, may be emphasized. Search terms and/or search results corresponding to establishments located in many localized areas, such as popular and ubiquitous coffee shops, fast food establishments, or the like, may be deemphasized.

Figure 4:
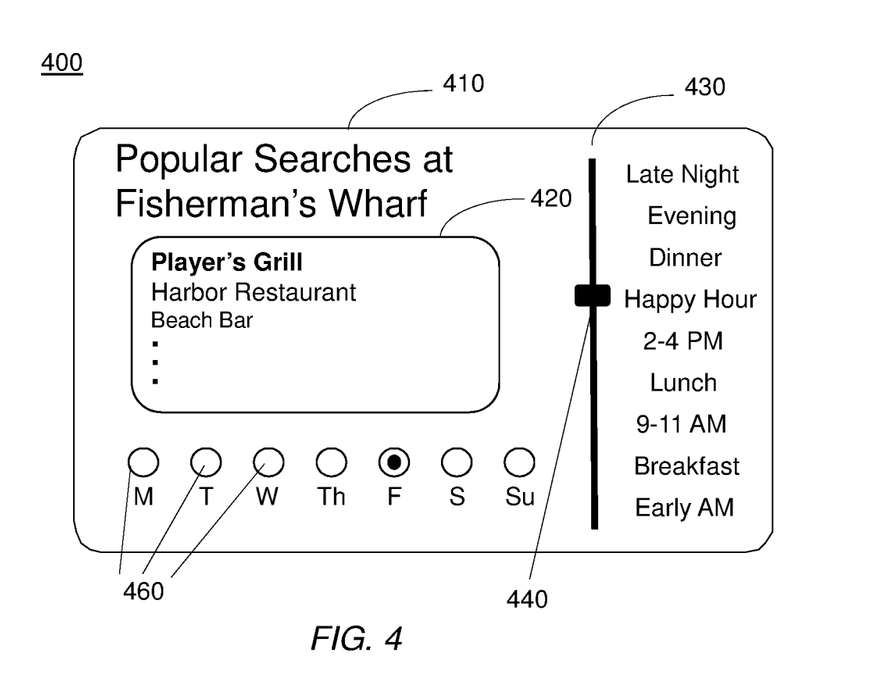

FIG. 4 shows a display device 400 rendering another possible user interface. It is noted that in an embodiment, rather than an online search engine, instead, a database of identifier query search terms and/or search results may be collected and searched, such as via database searching techniques. In the example of FIG. 4, a mobile device user may be particularly interested in popular establishments within a localized region that includes Fisherman's Wharf 120 of FIG. 1. As seen in FIG. 4, scrub bar slider 440 within window 410 has been positioned along scrub bar 430 to correspond to a customary socializing period (e.g., "Happy Hour") timeframe. Further, a day of a week corresponding to Friday has been indicated using day selector 460. Thus, a mobile device user searching for a popular venue at which a user may spend a customary socializing period, such as a happy hour, may refer to suggestions window 420 to establishments, such as "Players Grill," "Harbor Restaurant," and "Beach Bar" in decreasing order of popularity, for example. Again, in an embodiment, a database of collected terms and/or results may be searched rather than using an online search engine, for example.

Figure 5A:
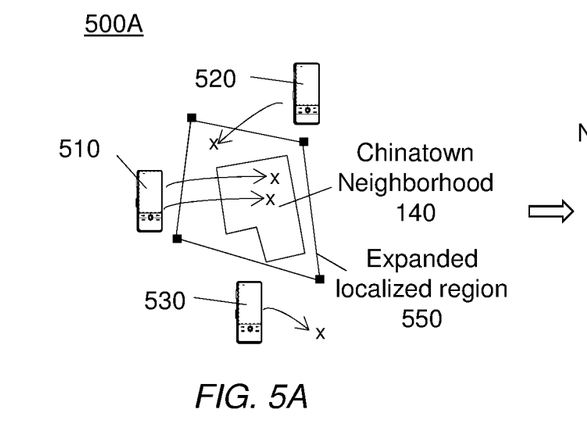
FIGS. 5A and 5B are schematic diagrams of a portion of a map showing a localized region according to an embodiment.
Figure 5B:
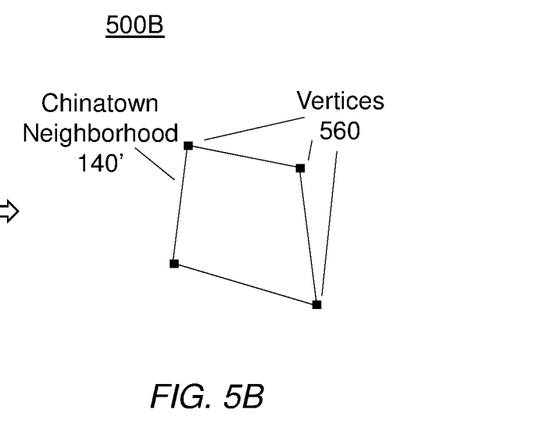

FIGS. 5A-5B are schematic diagrams of a portion of a map 500A showing a localized region that may be characterized by one or more search terms according to an embodiment. For example, at a given time of a day, users co-located with mobile devices 510, may submit one or more search terms and receive search results with greater frequency than a frequency at which particular search terms are submitted by mobile device users located elsewhere. In one example, one or more users co-located with mobile devices 510 within Chinatown neighborhood 140 may frequently submit queries for certain Chinese food items, such as "dim sum," just as an example, that may be submitted less frequently outside of neighborhood 140, for example. However, if mobile device users, such as mobile device user 520, located nearby a localized region of Chinatown neighborhood 140, submit queries for "dim sum," for example, at an increased frequency, such as a frequency beyond a threshold amount, a localized region of Chinatown neighborhood 140 may be expanded to include, for example, expanded localized region 550 as shown in FIG. 5B (500B). Accordingly, as mobile device users within expanded localized region of 550 submit search terms that may be seen with less frequency outside of an expanded localized region of 550, localized regions may be expanded to encompass a larger area. For example, as previously described, just for purposes of illustration, a desert area may be amenable to expansion in comparison with a densely populated urban area. For example, in an embodiment, appropriate sizing may be a feature associated with a client application of a web interface. Thus, in FIG. 5B, expanded localized region 550 may be seen as corresponding to Chinatown neighborhood 140', which may comprise a localized region that may be described using vertices at 560.

Thus, in an embodiment, as previously discussed, submitted queries and/or search results over a period (e.g., queries submitted to an online search engine and/or results) may be collected and organized in a database in a variety of ways to capture localized region and/or localized time period, for example. After a database is generated, in an embodiment, such as via a client application or via a web site portal, as examples, a database may be made accessible to device users, such as mobile device users. Likewise, of course, a generated database may be periodically updated, as well. One example embodiment of a method of using a database is illustrated in FIG. 6 and described below.

Figure 6:
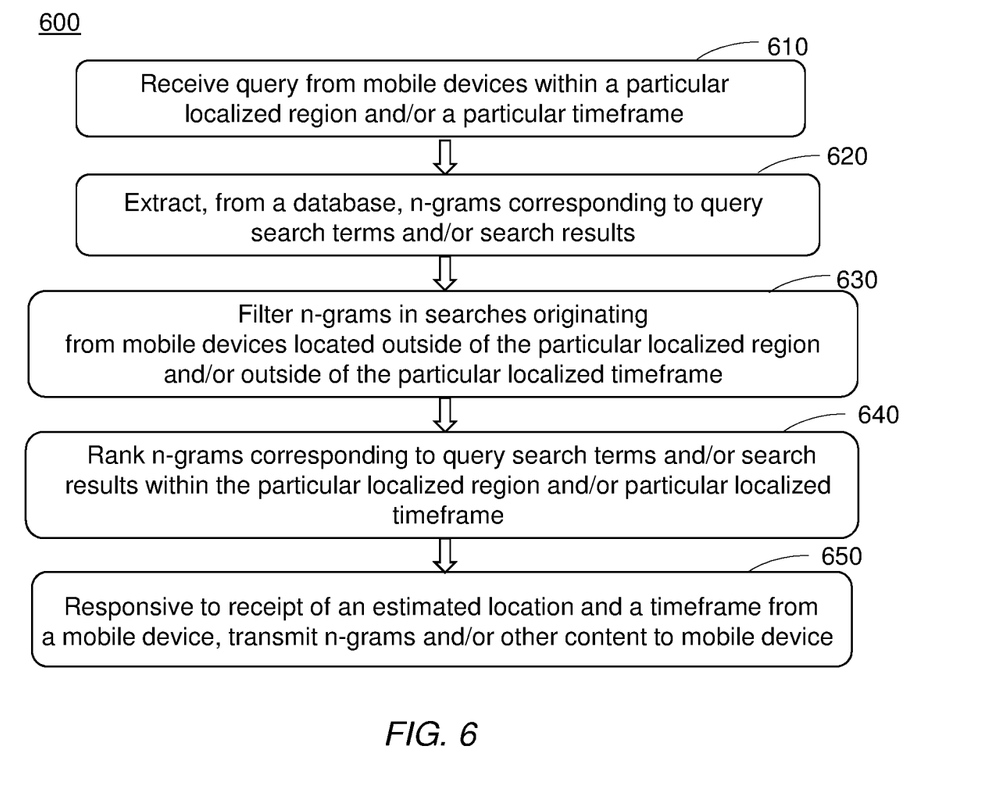
FIG. 6 is a flow chart for a method according to an embodiment.

FIG. 6 is a flow chart for a method according to an embodiment. Example implementations, such as those described in a method, such as embodied as FIG. 6, and others herein, may include blocks in addition to those shown and described, fewer blocks, blocks occurring in an order different than may be identified, or any combination thereof. A method embodied as FIG. 6, may begin at block 610. At block 610, a server, for example, may receive query search terms from mobile devices within a particular localized region and/or at a particular localized time frame, such as the Chinatown neighborhood, shown in FIG. 5A, during breakfast hours. Block 610 may further include receiving a query with search terms from mobile devices outside of a localized region, such as mobile device user 530 of FIG. 5A, may be located outside of Chinatown neighborhood 140, and/or outside a localized time frame. A method embodied as FIG. 6 may continue at block 620, in which received query search terms may be indexed and entered into a database, such as according to a localized timeframe and/or localized region, for example, such as described with reference to FIG. 2. Block 620 may further comprise associating n-grams (e.g., bigrams, trigrams, and so forth) with query search terms. In one possible example just to illustrate the point, a user entered query search term "ristorant in fisherman's warf" may be associated with the trigram "Fisherman's Wharf restaurant."

A method embodied as FIG. 6 may proceed to block 630, which may comprise filtering n-grams that may correspond to localized regions outside of the localized region within which the mobile device may be located and/or the particular timeframe of interest to the mobile device user. Thus, in one possible example, n-grams that appear to have little or nothing to do with the particular localized region, and/or the particular timeframe of interest to a user may, in an embodiment, be excluded from further processing. At 640, query search term n-grams and/or search results for the particular localized region and/or localized timeframes may be ranked within a particular localized region and/or a particular timeframe. A variety of techniques for ranking of relevance are known and may be employed. Claimed subject matter is not limited in scope in this respect. For example, queries for a much larger region may be compared. Thus, for example, query search n-grams and/or search results pertaining to establishments not necessarily unique to the particular localized region and/or the particular localized time frame, such as commonplace coffee shops, fast food establishments, and so forth, may be ranked lower than establishments unique to the localized area and/or localized time frame or even omitted from a database in an embodiment. At block 650, query search terms (e.g., n-grams comprising bigrams, trigrams, and so forth) and/or search results (and/or other content of related interest) may be transmitted across a communications channel to a mobile device in an embodiment.

Figure 7:
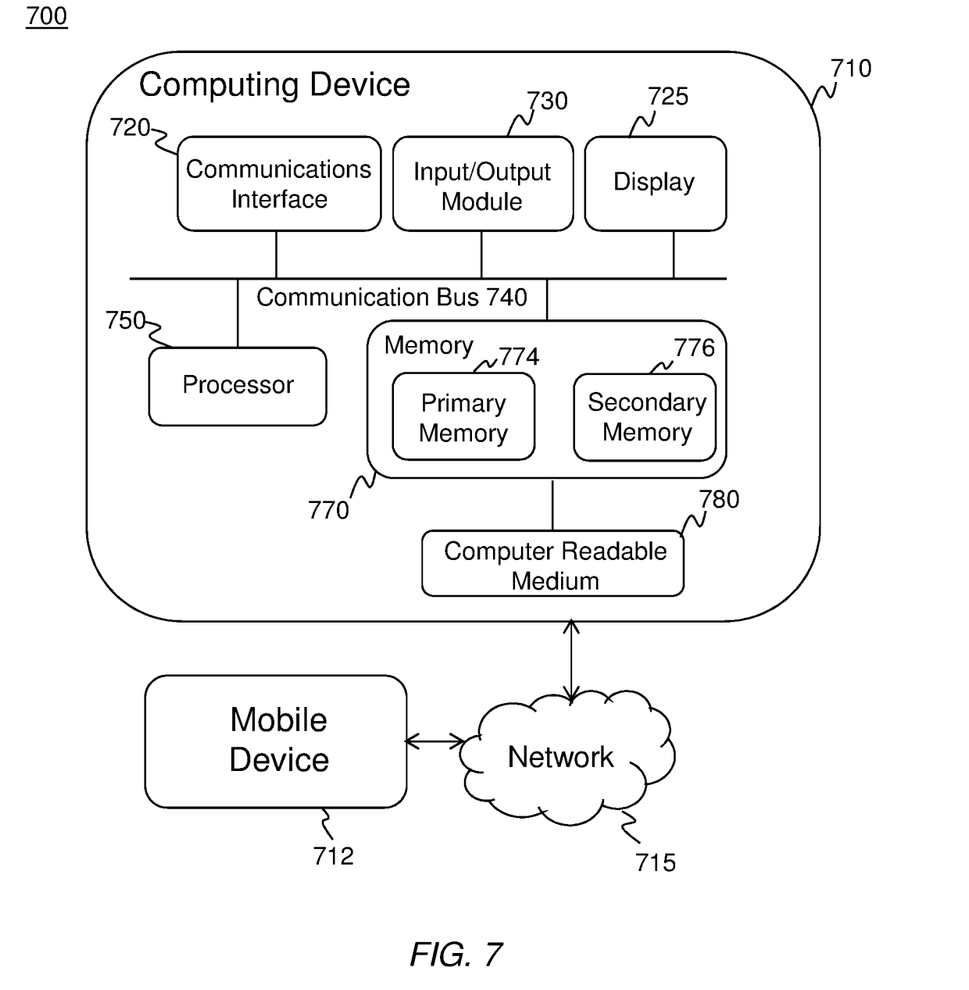
FIG. 7 is a schematic diagram of a computing platform that may be employed according to an embodiment.

For purposes of illustration, FIG. 7 is a schematic diagram 700 of a computing platform that may be employed for providing mobile device users with localized and/or time-selectable search terms according to an embodiment. A computing platform, such as that embodied in FIG. 7 may comprise computing device 710 that may be employed to perform operations such as, for example, described herein. In FIG. 7, computing device 710 may interface with client device 712, which may comprise features of a client device, for example. Communications interface 720, processor 750, and memory 770, which may comprise primary memory 774 and secondary memory 776, may communicate by way of communication bus 740, for example. In FIG. 7, computing device 710 may store various forms computer-implementable instructions, by way of input/output module 730, for example, such as those that may be operative as, which may, for example, parse search queries, arrange search queries into databases indexed by timeframes and/or localized regions, arrange search terms, and so forth. Client 712 may communicate with computing device 710 by way of an Internet connection via network 715, for example. Although a computing platform, such as the computing platform embodied in FIG. 7 shows the above-identified components, claimed subject matter is not limited to computing platforms having only these components as other implementations may include alternative arrangements that may comprise additional components, fewer components, or components that function differently while achieving similar results. Rather, examples are provided merely as illustrations. It is not intended that claimed subject matter be limited in scope to illustrative examples.

Processor 750 may be representative of one or more circuits, such as digital circuits, to perform at least a portion of a computing procedure or process. By way of example but not limitation, processor 750 may comprise one or more processors, such as controllers, microprocessors, microcontrollers, application specific integrated circuits, digital signal processors, programmable logic devices, field programmable gate arrays, and the like, or any combination thereof. In implementations, processor 750 may perform signal processing to manipulate signals and/or states or to construct signals and/or states, for example.

Memory 770 may be representative of any storage mechanism. Memory 770 may comprise, for example, primary memory 774 and secondary memory 776, additional memory circuits, mechanisms, or combinations thereof may be used. Memory 770 may comprise, for example, random access memory, read only memory, or one or more data storage devices or systems, such as, for example, a disk drive, an optical disc drive, a tape drive, a solid-state memory drive, just to name a few examples. Memory 770 may be utilized to store a program, as an example. Memory 770 may also comprise a memory controller for accessing computer readable-medium 780, which may implement a database indexed by timeframes and/or localized regions, arrange query search terms, and so forth. Under direction of processor 750, memory, such as cells storing physical states, representing, for example, a program, may be executed by processor 750 and generated signals may be transmitted via the Internet, for example. Processor 750 may also receive digitally encoded signals from computing device 710.

Network 715 may comprise one or more communication links, processes, and/or resources to support exchanging communication signals between a mobile device and server, which may, for example, comprise one or more servers (not shown). By way of example, but not limitation, network 715 may comprise wireless and/or wired communication links, telephone or telecommunications systems, Wi-Fi networks, Wi-MAX networks, the Internet, the web, a local area network (LAN), a wide area network (WAN), or any combination thereof.

The term "computing platform," as used herein, refers to a system and/or a device, such as a computing device, that includes a capability to process and/or store data in the form of signals and/or states. Thus, a computing platform, in this context, may comprise hardware, software, firmware, or any combination thereof (other than software per se). Computing platform 710, as depicted in FIG. 7, is merely one such example, and claimed subject matter is not limited to this particular example. For one or more embodiments, a computing platform may comprise any of a wide range of digital electronic devices, including, but not limited to, personal desktop or notebook computers, high-definition televisions, digital versatile disc (DVD) players and/or recorders, game consoles, satellite television receivers, cellular telephones, personal digital assistants, mobile audio and/or video playback and/or recording devices, or any combination of the above. Further, unless specifically stated otherwise, a process as described herein, with reference to flow diagrams and/or otherwise, may also be executed and/or affected, in whole or in part, by a computing platform.

Memory 770 may store cookies relating to one or more users and may also comprise a computer-readable medium that may carry and/or make accessible content, code and/or instructions, for example, executable by processor 750 or some other controller or processor capable of executing instructions, for example. A user may make use of an input device and/or an output device, such as a computer mouse, stylus, track ball, keyboard, or any other device capable of receiving an input from a user.

Regarding aspects related to a communications or computing network, a wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, and/or the like, which may move freely, randomly or organize themselves arbitrarily, such that network topology may change, at times even rapidly. Wireless network may further employ a plurality of network access technologies, including Long Term Evolution (LTE), WLAN, Wireless Router (WR) mesh, or 2nd, 3rd, or 4th generation (2G, 3G, or 4G) cellular technology, or other technologies, or the like. Network access technologies may enable wide area coverage for devices, such as client devices with varying degrees of mobility, for example.

A network may enable radio frequency or wireless type communications via a network access technology, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or other, or the like. A wireless network may include virtually any type of now known, or to be developed, wireless communication mechanism by which signals may be communicated between devices, such as a client device or a computing device, between or within a network, or the like.

Communications between a computing device and a wireless network may be in accordance with known, or to be developed cellular telephone communication network protocols including, for example, global system for mobile communications (GSM), enhanced data rate for GSM evolution (EDGE), and worldwide interoperability for microwave access (WiMAX). A computing device may also have a subscriber identity module (SIM) card, which, for example, may comprise a detachable smart card that stores subscription information of a user, and may also store a contact list of the user. A user may own the computing device or may otherwise be its primary user, for example. A computing device may be assigned an address by a wireless or wired telephony network operator, or an Internet Service Provider (ISP). For example, an address may comprise a domestic or international telephone number, an Internet Protocol (IP) address, and/or one or more other identifiers. In other embodiments, a communication network may be embodied as a wired network, wireless network, or combination thereof.

A computing or network device may vary in terms of capabilities or features. Claimed subject matter is intended to cover a wide range of potential variations. For example, a network device may include a numeric keypad or other display of limited functionality, such as a monochrome liquid crystal display (LCD) for displaying text. In contrast, however, as another example, a web-enabled computing device may include a physical or a virtual keyboard, mass storage, one or more accelerometers, one or more gyroscopes, global positioning system (GPS) or other location-identifying type capability, and/or a display with a higher degree of functionality, such as a touch-sensitive color 2D or 3D display, for example.

A computing device may include or may execute a variety of now known, or to be developed operating systems, or derivatives and/or versions, including personal computer operating systems, such as a Windows, iOS or Linux, or a mobile operating system, such as iOS, Android, or Windows Mobile, or the like. A computing device may include or may execute a variety of possible applications, such as a client software application enabling communication with other devices, such as communicating one or more messages, such as via email, short message service (SMS), or multimedia message service (MMS), including via a network, such as a social network including, but not limited to, Facebook, LinkedIn, Twitter, Flickr, or Google+, to provide only a few examples. A computing device may also include or execute a software application to communicate content, such as, for example, textual content, multimedia content, or the like. A computing device may also include or execute a software application to perform a variety of possible tasks, such as browsing, searching, playing various forms of content, including locally stored or streamed video, or games such as, but not limited to, fantasy sports leagues. The foregoing is provided merely to illustrate that claimed subject matter is intended to include a wide range of possible features or capabilities.

A network including a computing device, for example, may also be extended to another device communicating as part of another network, such as via a virtual private network (VPN). To support a VPN, transmissions may be forwarded to the VPN device. For example, a software tunnel may be created. Tunneled traffic may, or may not be encrypted, and a tunneling protocol may be substantially complaint with or substantially compatible with any past, present or future versions of any of the following protocols: IPSec, Transport Layer Security, Datagram Transport Layer Security, Microsoft Point-to-Point Encryption, Microsoft's Secure Socket Tunneling Protocol, Multipath Virtual Private Network, Secure Shell VPN, or another existing protocol, or another protocol that may be developed.

A network may be compatible with now known, or to be developed, past, present, or future versions of any, but not limited to the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, or X.25. A network may employ, for example, TCP/IP, UDP, DECnet, NetBEUI, IPX, Appletalk, other, or the like. Versions of the Internet Protocol (IP) may include IPv4, IPv6, other, and/or the like.

It will, of course, be understood that, although particular embodiments will be described, claimed subject matter is not limited in scope to a particular embodiment or implementation. For example, one embodiment may be in hardware, such as implemented to operate on a device or combination of devices, for example, whereas another embodiment may be, at least in part, in software. Likewise, an embodiment may be implemented in firmware, or as any combination of hardware, software, and/or firmware, for example (other than software per se). Likewise, although claimed subject matter is not limited in scope in this respect, one embodiment may comprise one or more articles, such as a storage medium or storage media. Storage media, such as, one or more CD-ROMs and/or disks, for example, may have stored thereon instructions, executable by a system, such as a computer system, computing platform, or other system, for example, that may result in an embodiment of a method in accordance with claimed subject matter being executed, such as a previously described embodiment, for example; although, of course, claimed subject matter is not limited to previously described embodiments. As one potential example, a computing platform may include one or more processing units or processors, one or more devices capable of inputting/outputting, such as a display, a keyboard and/or a mouse, and/or one or more memories, such as static random access memory, dynamic random access memory, flash memory, and/or a hard drive.

In the preceding detailed description, numerous specific details have been set forth to provide a thorough understanding of claimed subject matter. However, it will be understood by those skilled in the art that claimed subject matter may be practiced without these specific details. In other instances, methods and/or apparatuses that would be known by one of ordinary skill have not been described in detail so as not to obscure claimed subject matter. Some portions of the preceding detailed description have been presented in terms of logic, algorithms, and/or symbolic representations of operations on binary signals or states, such as stored within a memory of a specific apparatus or special purpose computing device or platform. In the context of this particular specification, the term specific apparatus or the like includes a general purpose computing device, such as general purpose computer, once it is programmed to perform particular functions pursuant to instructions from program software.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing information. It has proven convenient at times, principally for reasons of common usage, to refer to such signals and/or states as bits, data, values, elements, symbols, characters, terms, numbers, numerals, information, and/or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing device. In the context of this specification, therefore, a special purpose computer and/or a similar special purpose computing device is capable of processing, manipulating and/or transforming signals and/or states, typically represented as physical electronic and/or magnetic quantities within memories, registers, and/or other information storage devices, transmission devices, and/or display devices of the special purpose computer and/or similar special purpose computing device. In the context of this particular patent application, as mentioned, the term "specific apparatus" may include a general purpose computing device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

While there has been illustrated and/or described what are presently considered to be example features, it will be understood by those skilled in the relevant art that various other modifications may be made and/or equivalents may be substituted, without departing from claimed subject matter. Additionally, many modifications may be made to adapt a particular situation to the teachings of claimed subject matter without departing from one or more central concept(s) described herein. Therefore, it is intended that claimed subject matter not be limited to the particular examples disclosed, but that such claimed subject matter may also include all aspects falling within appended claims and/or equivalents thereof.

What is claimed is:

1. A method comprising:
   generating a database of queries submitted to a search engine and/or associated query results for a specified period; wherein generating the database comprises determining more popular submitted queries for at least one of a particular localized region or a particular localized time period, wherein the determination is based on at least one of the particular localized region or the particular localized time period;
   wherein determining the more popular submitted queries comprises including submitted queries that comprise identified n-grams based on at least one of the particular localized region or the particular localized time period.

2. The method of claim 1, wherein determining the more popular submitted queries comprises excluding more popular submitted queries not specific to at least one of the particular localized region or the particular localized time period.

3. The method of claim 1, wherein:
   the localized region comprises a wide range of localized over the geographical areas of the Earth; and
   the localized time period comprises a wide range of localized time period over the geographical areas of the Earth.

4. The method of claim 3, wherein the wide range of localized regions comprises localized regions having one or more irregularly shaped boundary or one or more boundaries defined by at least a portion of a polygon.

5. The method of claim 3, wherein the localized time period comprises a time span measured in at least one of hours, minutes, a mealtime, or a customary occurrence.

6. The method of claim 1, wherein generating the database comprises using at least one of location-position information included with the submitted queries or a time stamp included with submitted queries.

7. The method of claim 1, further comprising: periodically updating the database.

8. A method comprising:
searching a database, the database being of more popular queries submitted to a search engine and associated query results for at least one of particular localized regions or particular localized time periods, wherein the database is based at least in part on at least one of the particular localized regions or the particular localized time periods, and wherein the database includes submitted queries that comprise identified n-grams based on at least one of the particular localized region or the particular localized time period.

9. The method of claim 8, wherein searching the database comprises: submitting search terms via an online interface.

10. The method of claim 9, wherein the online interface comprises a web interface.

11. The method of claim 8, wherein searching the database comprises: submitting search terms via a client application.

12. The method of claim 11, wherein the client application executes on a mobile computing device.

13. The method of claim 12, wherein the mobile computing device renders an estimated location of the mobile device within the particular localized region.

14. The method of claim 12, wherein the mobile computing device displays popular queries based, at least in part, on a user's history of searches.

15. An article comprising:
a non-transitory storage medium comprising machine-readable instructions stored thereon which are executed by a special-purpose computer apparatus to:
generate a database of queries submitted to a search engine and/or associated query results for a specified period; wherein generating the database comprises determining more popular submitted queries for at least one of a particular localized region or a particular localized time period, wherein the determination is based on at least one of an estimated location of a mobile device or the particular localized time period; and
determine the more popular submitted queries by including queries that comprise identified n-grams based on at least one of the particular localized region or the particular localized time period.

16. The article of claim 15, wherein the machine-readable instructions are additionally to: determine the more popular submitted queries by excluding more popular submitted queries not specific to at least one of the particular localized region or the particular localized time period.

17. The article of claim 15, wherein the machine-readable instructions are additionally to: direct a mobile device to render an estimated location of the mobile device within the particular localized region.

18. The article of claim 17, wherein the machine-readable instructions are additionally to: display popular queries based, at least in part, on a user's history of searches.

* * * * *